Figure 1:
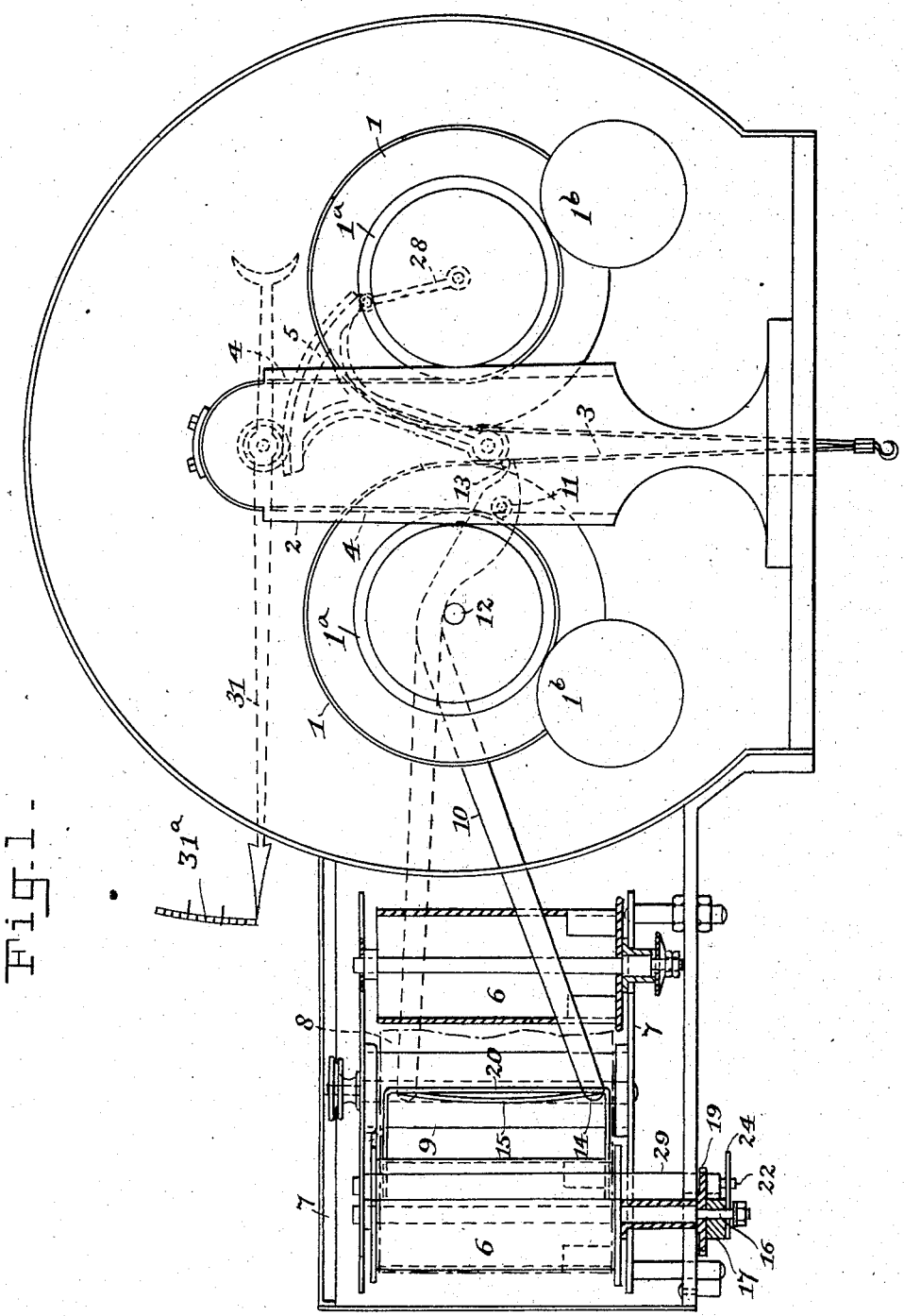

No. 727,286. PATENTED MAY 5, 1903.
C. A. CARLSON.
REGISTERING DEVICE IN AUTOMATIC SCALES.
APPLICATION FILED DEC. 14, 1901.
NO MODEL. 3 SHEETS—SHEET 1.

Witnesses:
Inventor:
Carl Adam Carlson
By Richards
his Attorneys

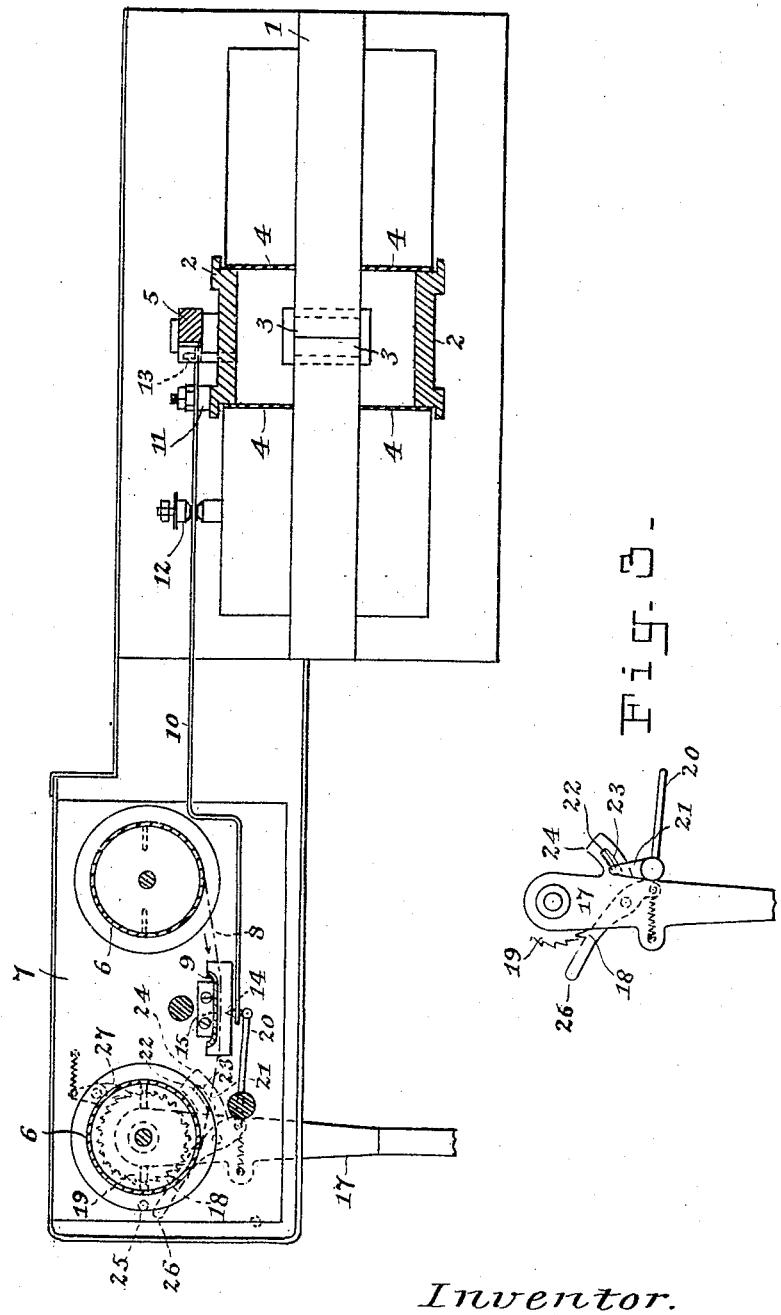

No. 727,286. PATENTED MAY 5, 1903.
C. A. CARLSON.
REGISTERING DEVICE IN AUTOMATIC SCALES.
APPLICATION FILED DEC. 14, 1901.
NO MODEL. 3 SHEETS—SHEET 3
Fig. 4.
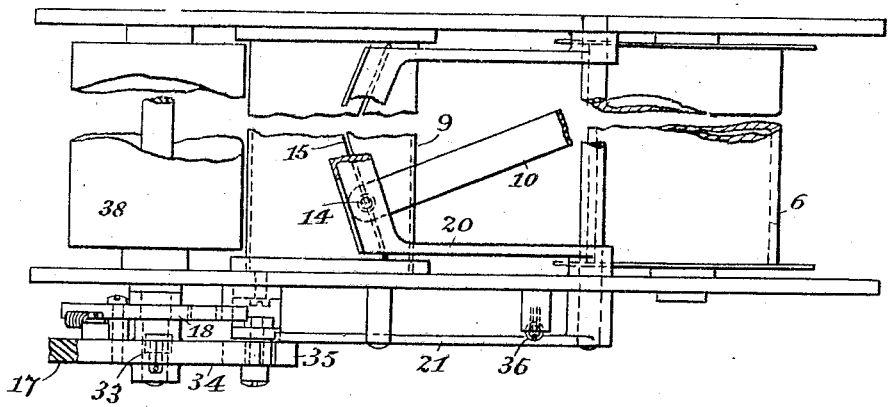
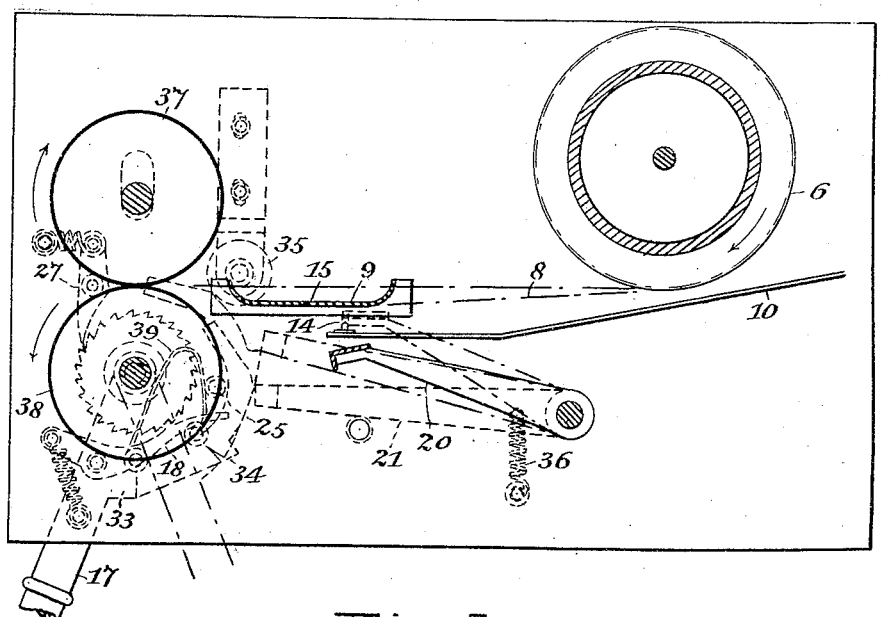
Fig. 5.
Witnesses:
E. B. Bolton
Isabella Waldron
Inventor:
Carl Adam Carlson
By Richards
his Attorneys.

No. 727,286. Patented May 5, 1903.

UNITED STATES PATENT OFFICE.

CARL ADAM CARLSON, OF STOCKHOLM, SWEDEN, ASSIGNOR TO VÄGFA-BRIKS AKTIEBOLAGET STATHMOS, OF STOCKHOLM, SWEDEN.

REGISTERING DEVICE IN AUTOMATIC SCALES.

SPECIFICATION forming part of Letters Patent No. 727,286, dated May 5, 1903.

Application filed December 14, 1901. Serial No. 85,940. (No model.)

*To all whom it may concern:*

Be it known that I, CARL ADAM CARLSON, director of works, a subject of the King of Sweden and Norway, and a resident of Stockholm, in the Kingdom of Sweden, have invented certain new and useful Improvements in Registering Devices in Automatic Scales, of which the following is a specification, reference being had therein to the accompanying drawings.

This invention relates to a registering device in automatic scales in which the platform is lowered according as the load increases; and it has for its object recording the result of each weighing on a strip of paper or the like, which is successively fed forward. Recording is performed by means of a pencil or the like attached to an indicator consisting of a lever-arm, which is automatically set by the scales in proper position with relation to the strip of paper, (which may or may not be graduated,) and which lever may by a single grip be brought to make a mark on said strip. All the results obtained may be subsequently read off from the strip and added together. Besides the saving of time thus obtained in the weighing operations every possibility of errors in recording is excluded.

In the accompanying drawings the device is shown as applied to roller-scales, in Figure 1 viewed in a front elevation and in Fig. 2 in a plan view. Fig. 3 is a detail view; and Figs. 4 and 5 are respectively an elevation and a plan, partly in section, of a modified form.

Of previously-known parts of the scales only the rollers 1 1 and the standard 2 are shown, along which latter the former roll. The rollers 1 comprise each a wide portion to which the numeral "1" is applied, and a narrow portion, (indicated at 1ª.) Friction-rollers 1ᵇ may, if desired, be arranged to press against the narrow portions. The load acts, as usual, on the bands 3, depending from the wide portions of the rollers, while other bands 4 are wound around the narrower parts of the rollers and connect the rollers with the standard 2, to the upper end of which they are secured. By means of a link 28, suitable lever motion, or the like the motion upward of the roller is transformed into a revolving one at the toothed sector 5, which acts on a pointer 31, provided on its shaft with a pinion, said pointer indicating the results on a graduated dial, (indicated at 31ª.) The registering device consists of the two rollers 6 6, journaled vertically at some distance apart in the framework 7, secured to the scales in some suitable manner. The comparatively wide paper strip 8 is wound on the rollers 6 6 in such a manner as to be transferred from one to the other as the rollers are rotated. Between the rollers a support 9 is fixed to the framework, and the paper strip advances over it, Fig. 2. The connection between the said strip and the weighing mechanism proper is composed of the crooked lever or indicator 10. This is rotatably mounted on the standard 2 by means of the pin 11 and rests on a pin 12, projecting from one of the rollers 1 and further extends with its outer long arm over the strip 8. With its inner short arm the lever rests against the fixed pin 13 when the roller 1 is in its bottom position—*i. e.*, when the scales are without load—the lever 10 then occupying its lower position. At its outer end the lever 10 is provided with a pencil-point 14, directed against the strip and arranged to penetrate and make a mark on the strip when the lever is pressed against the latter from without. The support 9 then serves as a bearing. It is provided with a longitudinal slot 15 for the point 14. Mounted to turn upon the downwardly-extended axle of one of the rollers 6 is a lever 17, said lever being provided with a pawl 18, engaging a toothed wheel 19, fixed to the axle. Journaled in the framework in front of the paper strip is a lever 20 of the same width (in vertical direction) as the strip of paper, said lever being therefore made in the form of a loop, as shown in Fig. 1. The lever 10 projects behind the lever 20. The latter is provided below upon its axle of revolution with a short arm 21, a pin 22 projecting from the said arm into a slot 23 in an extension 24 of the lever 17 (see Fig. 3) or between shoulders or the like upon the said extension. The pawl 18 has an extension 26 coöperating with a fixed pin 25 to disengage the pawl from the wheel 19 when the lever 17 is turned sufficiently to the left, Fig. 2. Further there is a retaining-pawl 27 for the wheel 19, springs for keeping the pawls in engagement with the wheel, &c. The paper strip is ruled lengthwise and graduated from below upward from the zero or other minimum position of the lever or indicator 10 to a suitable maximum position. When the scales are without load, the lever 10 points, for instance, at "0." When the scales are loaded, the roller 1 moving upwardly carries the lever 10 upward. The latter will then take up such a position that the pencil-point 14 comes on a level with the line of scale upon the paper strip corresponding to the load. The weighing person now turns the lever 17 to the left. The strip is thereby fed forward in the direction of the arrow, Fig. 2, but is soon arrested in that the pawl 18 is moved by the pin 25 out of engagement with the toothed wheel 19. At the same time during the continued movement of the lever 17 to the left the lever-arm 21, whose pin 22 has meanwhile reached the right end of slot 23, is caused to partake in the movement of lever 17, the lever-arm 20 thus being turned toward the lever 10, which is thereby bent inward and pressed against the paper strip in which the pencil-point 14 makes a perforation. The lever 17 is then brought back to its initial position. By this operation the lever 20 is brought back in its former position and the lever 10 resumes the position shown in Fig. 2 on account of its own elasticity. On account of the width of the lever 20 the latter is capable of pressing the lever 10 against the paper strip whatever position the lever 10 may take up. The several weighings are represented by the marks made upon the strip, the one after the other, said marks being easily read off.

Figs. 4 and 5 show the registering device somewhat modified in order to adapt it for scales that are suddenly unloaded—for instance, in weighing running railway-carriages or wagons. The modification substantially consists therein that when the lever 17 is turned the pencil-point 14 of the lever or indicator 10 contacts with the paper strip only for a moment whether the lever 17 be turned back sooner or later. When the wagon rolls away from the platform of the scales situated in the railway, the lever 10 is, namely, set in motion. If at the same time the lever 10 were in contact with the strip of paper on account of the lever 17 not having been turned back, the strip would be torn asunder by the pencil-point. The mechanism is therefore constructed in the following way: The lever 17 is provided with a catch 34, which is pivotally connected with a lateral projection 33 on the lever and strikes a downward-pointing pin on the arm 21 and moves same when the lever is turned to the right, Fig. 5, the arm 20 thereby pressing the lever 10 against the strip. The turning to the right being continued, said catch 34 strikes with its free curved end a roller 35, mounted on a fixed pin, whereby the catch is turned forward away from the arm 21, which is then returned by the spring 36. Thus the lever 10 is in contact with the paper strip only for a moment. The advancing of the strip takes place before the catch 34 strikes the arm 21. The device adapted for this purpose is about the same as the one described above, except that the pawl 18 and the teeth of the wheel 19 are so directed as to feed the strip at the beginning of the movement of the lever 17 to the right. The strip is transferred from the roller 6 and advanced by two friction-rollers 37 and 38, bearing against each other. The roller 37 may be journaled, if desired, in elongated bearing-slots, as indicated in dotted lines in Fig. 5. The roller or pin 25 disengages the pawl 18 from the wheel in the manner stated above, whereupon the catch 34 strikes the arm 21. The spring 39 tends to keep the catch 34 in its fore position and permits the movement backward of the catch, which is necessary for the same to clear the lever-arm 21 when the lever 17 is brought back to its initial position. As soon as the indicator moves and stops at a line of the paper strip the lever 17 is turned to the right, the recording being then performed by the lever-arm or indicator 10, which is able to return to the zero-mark when the weighing mechanism is unloaded even if the lever 17 should be held for some time in its inner position. Fig. 5 shows by dotted lines the lever 17 turned to the right as far as possible and the catch 34 moved to its rear position by the roller 35.

Having now described my invention, what I claim as new, and desire to secure by Letters Patent, is—

1. The combination of a weighing mechanism, a lever-arm 10 for registering the weight, a paper strip wound around a roller 6, on which the weight is indicated by the indicator 10, actuated by the weighing mechanism when being loaded, a lever 17, which rotates by means of pawl and toothed wheel a roller 6 feeding forward said strip and, when the feeding is performed and the turning of the lever is continued, acts upon the device for pressing the indicator, and a marking device carried by said indicator adapted to be pressed thereby against the strip, substantially as set forth.

2. The combination of a weighing mechanism, an indicator 10 for registering the weight on a paper strip 8, a lever 17 and a roller 6 for feeding the said strip forward, a pawl 18 pivoted to the lever and engaging a toothed wheel 19 on the roller 6 thereby rotating the same when the lever is turned, and an obstacle 25 in the path of the pawl 18 disengaging the pawl from the toothed wheel and interrupting the feeding of the strip, when the lever is turned to a certain extent but has not been brought to its end position, substantially as set forth.

3. The combination of a weighing mechanism, an indicator 10 for registering the weight on a paper strip 8, a device including the lever 17 for intermittently feeding the said strip forward, a support 9 over which the strip advances, a wide lever-arm 20, under which the said lever-arm or indicator 10 moves, a lever 17, which, when being turned, acts upon the strip-feeding device and presses the said lever-arm 20 against the indicator 10, a pin 14 on which is thereby brought in contact with the strip 8, a pin 14 on the indicator and a slot 15 in the support 9 corresponding to the said pin and permitting the same to penetrate the strip, substantially as set forth.

4. The combination of a weighing mechanism, a part 10 for indicating the weight on a leaf, paper strip 8, a device including the lever 17 for feeding the strip forward, means for pressing the said part 10, when moved into the indicating position, against the strip 8, a lever 17 or the like which when being turned acts upon the feeding device at first, a part 20 upon which lever 17 acts after the disengagement of said feeding device, and a device for disengaging the lever 17 from the said indicator after the turning of the same to a certain extent, in order that the indicator 10 may be in contact with the strip 8 only for a moment, substantially as set forth.

5. The combination of a weighing mechanism, a part 10 for indicating the weight on a strip, a lever 17, a catch 34 pivoted to the same, a lever-arm 21 connected with a part 20 adapted to press the indicating part 10 against the strip, and an obstacle 35 in the path of the said catch disengaging the same from the lever-arm 21, when the lever 17 has been turned to a certain extent, in order that the indicating part 10 may be in contact with the strip only for a moment, substantially as set forth.

6. The combination of a weighing mechanism provided with rollers 1, 1 and bands 3, 3, 4, 4, which acted upon by the load move the rollers, around which the bands are wound, a part 10 for indicating the weight on a paper strip 8, a device including the lever 17 for feeding the strip forward, a device for pressing the part 10 moved into the indicating position against the strip, a lever 17 or the like, which when being turned acts upon the strip-feeding device and presses the said indicating part against the strip in order to make a mark on the same, substantially as set forth.

In witness whereof I have hereunto signed my name in the presence of two subscribing witnesses.

CARL ADAM CARLSON.

Witnesses:
ERNST SVANQVIST,
A. F. LUNDBORG.

---

Correction in Letters Patent No. 727,286.

It is hereby certified that the name of the assignee in Letters Patent No. 727,286, granted May 5, 1903, upon the application of Carl Adam Carlson, of Stockholm, Sweden, for an improvement in "Registering Devices in Automatic Scales," was erroneously written and printed "Vägfabriks Aktiebolaget Stathmos," whereas said name should have been written and printed *Vägfabriks Aktiebolaget Stathmos;* and that the said Letters Patent should be read with this correction therein that the same may conform to the record of the case in the Patent Office.

Signed and sealed this 14th day of July, A. D., 1903.

[SEAL.]

E. B. MOORE,
*Acting Commissioner of Patents.*